US012812599B2

(12) United States Patent
Liu et al.

(10) Patent No.: US 12,812,599 B2
(45) Date of Patent: Nov. 24, 2026

(54) METHOD FOR DETERMINING PAGING RESTRICTION RULE, COMMUNICATION DEVICE, AND STORAGE MEDIUM

(71) Applicant: BEIJING XIAOMI MOBILE SOFTWARE CO., LTD., Beijing (CN)

(72) Inventors: Jianning Liu, Beijing (CN); Yang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 281 days.

(21) Appl. No.: 18/701,914

(22) PCT Filed: Oct. 18, 2021

(86) PCT No.: PCT/CN2021/124510

§ 371 (c)(1),
(2) Date: Apr. 16, 2024

(87) PCT Pub. No.: WO2023/065091

PCT Pub. Date: Apr. 27, 2023

(65) Prior Publication Data

US 2025/0227663 A1 Jul. 10, 2025

(51) Int. Cl.
*H04W 68/02* (2009.01)
*H04W 76/27* (2018.01)
*H04W 76/34* (2018.01)

(52) U.S. Cl.
CPC ........... *H04W 68/02* (2013.01); *H04W 76/27* (2018.02); *H04W 76/34* (2018.02)

(58) Field of Classification Search
CPC ... H04W 48/02; H04W 60/005; H04W 68/02; H04W 76/27; H04W 76/34; H04W 88/06
See application file for complete search history.

(56) References Cited

U.S. PATENT DOCUMENTS

2012/0015657 A1* 1/2012 Comsa .................. H04L 5/0048 455/456.6
2013/0015953 A1* 1/2013 Hsu ......................... H04W 4/08 340/7.46
2015/0282145 A1* 10/2015 Kim ...................... H04W 72/20 455/450

(Continued)

FOREIGN PATENT DOCUMENTS

AU 2023258412 A1 * 11/2023 ............ H04W 84/10
EP 4164309 A1 * 4/2023 ............ H04W 68/02
EP 4213552 A1 * 7/2023 ............ H04W 8/183

OTHER PUBLICATIONS

Lin et al. U.S. Appl. No. 63/250,294, filed Sep. 30, 2021 (Year: 2021).*

(Continued)

*Primary Examiner* — Wutchung Chu
(74) *Attorney, Agent, or Firm* — Cozen O'Connor

(57) ABSTRACT

A method for determining a paging restriction rule, performed by a user equipment (UE), includes sending a request message, in which the request message includes first paging restriction information and the first paging restriction information indicates one or more paging restriction rules supported by the UE and receiving a response message to the request message, in which the response message indicates a paging restriction rule selected by a network device.

20 Claims, 8 Drawing Sheets

(56) References Cited

U.S. PATENT DOCUMENTS

| | | | | |
|---|---|---|---|---|
| 2017/0359772 | A1* | 12/2017 | Lee | H04W 76/28 |
| 2017/0359813 | A1* | 12/2017 | Lee | H04W 52/0212 |
| 2018/0035380 | A1* | 2/2018 | Chen | H04B 1/1615 |
| 2019/0159168 | A1* | 5/2019 | Wang | H04W 68/02 |
| 2019/0306720 | A1* | 10/2019 | Nakarmi | H04W 76/27 |
| 2020/0245292 | A1* | 7/2020 | Huang | H04W 68/12 |
| 2020/0305118 | A1* | 9/2020 | Ryu | H04W 68/005 |
| 2020/0351818 | A1* | 11/2020 | Park | H04W 4/06 |
| 2020/0404617 | A1* | 12/2020 | Murray | H04W 52/0229 |
| 2021/0329588 | A1* | 10/2021 | Jia | H04W 68/005 |
| 2022/0191825 | A1* | 6/2022 | Nord | H04W 68/02 |
| 2023/0007624 | A1* | 1/2023 | Murray | H04W 68/005 |
| 2023/0038897 | A1* | 2/2023 | Li | H04W 68/02 |
| 2023/0045765 | A1* | 2/2023 | Youn | H04W 60/005 |
| 2023/0097792 | A1* | 3/2023 | Wong | H04W 76/12 370/329 |
| 2023/0101436 | A1* | 3/2023 | Lin | H04W 48/02 455/458 |
| 2023/0319778 | A1* | 10/2023 | Xue | H04W 52/0229 455/458 |
| 2023/0354010 | A1* | 11/2023 | Hong | H04W 8/205 |
| 2024/0023067 | A1* | 1/2024 | Ke | H04W 68/005 |
| 2024/0163934 | A1* | 5/2024 | Freda | H04W 48/12 |
| 2024/0179513 | A1* | 5/2024 | Kalbasi | H04W 8/183 |
| 2024/0205881 | A1* | 6/2024 | Kalbasi | H04W 68/02 |
| 2024/0236945 | A1* | 7/2024 | Kim | H04W 68/005 |
| 2024/0357550 | A1* | 10/2024 | Hong | H04W 68/12 |
| 2026/0059580 | A1* | 2/2026 | Zhou | H04W 68/02 |

OTHER PUBLICATIONS

Ericsson et al. “Multi-USIM mode leaving in EPS” 3GPP TSG-CT WG1 Meeting #129-e, C1-212169, Apr. 2021, 53 pages.

China Telecom “AMF confirm whether accept the paging restriction information in RR message requested by the MUSIM UE” 3GPP TSG-CT WG1 Meeting #131-e, C1-214091, Aug. 2021, 34 pages.

European Patent Application No. 21960852.8, Search and Opinion dated Nov. 7, 2024, 10 pages.

PCT/CN2021/124510, International Search Report dated Jul. 19, 2022, 2 pages.

3rd Generation Partnership Project; Technical Specification Group Services and System Aspects; Study on system enablers for devices having multiple Universal Subscriber Identity Modules (USIM) (Release 17) 3GPP TR 23.761 V0.5.0 (Sep. 2020).

LG Electronics “KI #1, Sol #10: Update to remove ENs” SA WG2 Meeting #140E, S2-2005300, Aug.-Sep. 2020, 6 pages.

Nokia et al. “Solution for improved paging in MUSIM devices (KI#1,2,3)” S2-2000855, Jan. 2020, 7 pages.

* cited by examiner

METHOD FOR DETERMINING PAGING RESTRICTION RULE, COMMUNICATION DEVICE, AND STORAGE MEDIUM

CROSS-REFERENCE TO RELATED APPLICATION

This application is a national phase of International Application No. PCT/CN2021/124510, filed on Oct. 18, 2021, the entire content of which is incorporated herein by reference.

TECHNICAL FIELD

The disclosure relates to the field of wireless communication technologies, and in particular to a method for determining a paging restriction rule, a communication device, and a storage medium.

BACKGROUND

With the development of communication technologies, some communication terminals each may have multiple subscriber identity modules (SIMs) and these SIMs may be signed by the same communication operator or different communication operators.

These accounts associated with each SIM may provide different services to the communication terminal. According to equipment configurations, one SIM(s) is responsible for telephone services and another SIM(s) is responsible for data services. When one of the SIMs of the communication terminal enters an idle state, other SIM(s) of the communication terminal enter a connected state to provide communication services.

For a multi-SIM terminal, paging a SIM(s) in a radio resource control (RRC) idle state is a problem that needs further research.

SUMMARY

According to a first aspect of the disclosure, a method for determining a paging restriction rule is provided. The method is performed by a user equipment (UE). The method includes: sending a request message, in which the request message includes first paging restriction information; and the first paging restriction information indicates one or more paging restriction rules supported by the UE; and receiving a response message to the request message, in which the response message indicates whether the first paging restriction information is accepted or not by a network device.

According to a second aspect of the disclosure, a method for determining a paging restriction rule is provided. The method is performed by a network device. The method includes: receiving a request message, in which the request message includes first paging restriction information; and the first paging restriction information indicates one or more paging restriction rules supported by the UE; and sending a response message to the request message, in which the response message indicates whether the first paging restriction information is accepted or not by the network device.

According to a third aspect of the disclosure, a communication device is provided. The device includes a processor, a transceiver, and a memory for storing executable programs, in which the processor is configured to execute the executable programs, to perform the method according to the first aspect or the second aspect.

BRIEF DESCRIPTION OF THE DRAWINGS

The accompanying drawings, which are incorporated in and constitute a part of this specification, illustrate embodiments consistent with the disclosure and, together with the descriptions, serve to explain the principles of the disclosure.

DETAILED DESCRIPTION

Reference will now be made in detail to some embodiments, examples of which are illustrated in the accompanying drawings. The following descriptions refer to the accompanying drawings in which the same numbers in different drawings represent the same or similar elements unless otherwise represented. The implementations set forth in the following descriptions according to some embodiments do not represent all implementations consistent with the disclosure. Instead, they are merely examples of apparatuses and methods consistent with aspects related to the disclosure as recited in the appended claims.

The terms used according to embodiments of the disclosure are only for the purpose of describing specific embodiments, and are not intended to limit embodiments of the disclosure. The singular forms of "a" and "the" used according to embodiments of the disclosure and in appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used according to embodiments of the disclosure to describe various information, the information should not be limited to these terms. These terms are only used to distinguish the same type of information from each other. For example, without departing from the scope according to embodiments of the disclosure, the first information may also be referred to as the second information, and similarly, the second information may also be referred to as the first information. Depending on the context, the word "if" as used herein can be interpreted as "when", "while" or "in response to determining".

Figure 1:
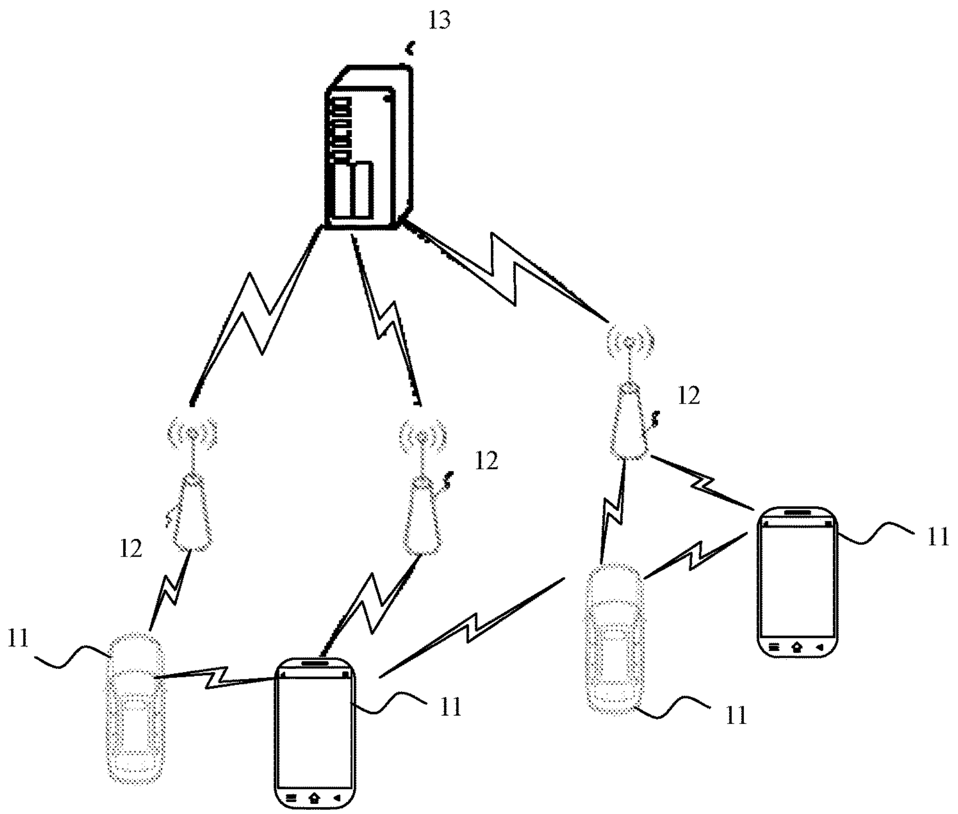
FIG. 1 is a schematic block diagram of a wireless communication system according to some embodiments.

With reference to FIG. 1, it illustrates a schematic block diagram of a wireless communication system according to embodiments of the disclosure. As illustrated in FIG. 1, the wireless communication system is a communication system based on cellular mobile communication technologies. The wireless communication system may include several UEs 11 and several access devices 12.

The UE 11 may be a device that provides voice and/or data connectivity to a user. The UE 11 may communicate with one or more core networks via a radio access network (RAN). The UE 11 may be an Internet of Things (IoT) UE such as a sensor device, a mobile phone (or a cellular phone), or a computer with the IoT UE such as a fixed, portable, pocket-sized, handheld, built-in computer, or vehicle-mounted device, for example, station (STA), subscriber unit, subscriber station, mobile station, mobile, remote station, access point, remote terminal, access terminal, user terminal, user agent, user device, or user equipment (UE). Alternatively, the UE 11 may also be a device of an unmanned aircraft. Alternatively, the UE 11 may also be a vehicle-mounted device, for example, a trip computer having a wireless communication function or a wireless communication device externally connected to the trip computer. Alternatively, the UE 11 may also be a roadside device, for example, a street lamp, a signal lamp, or other roadside device having the wireless communication function.

The access device 12 may be a network side device in the wireless communication system. The wireless communication system may be the 4th generation mobile communication (4G) system, also known as the long term evolution (LTE) system. The wireless communication system may also be the 5th generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be the machine-type communication (MTC) system.

The access device 12 may be an evolved access device (eNB) adopted in the 4G system. Alternatively, the access device 12 may also be an access device (gNB) adopting a centralized and distributed architecture in the 5G system. When the access device 12 adopts the centralized and distributed architecture, it usually includes a central unit (CU) and at least two distributed units (DUs). The CU is provided with a protocol stack having a packet data convergence protocol (PDCP) layer, a radio link control (RLC) layer, and a media access control (MAC) layer. The DU is provided with a protocol stack having a physical (PHY) layer. The embodiments of the disclosure do not limit the specific implementation manner of the access device 12.

A wireless link can be established between the access device 12 and the UE 11 through a wireless air interface. In different embodiments, the wireless air interface is a wireless air interface based on the 4G standard. Alternatively, the wireless air interface is a wireless air interface based on the 5G standard, for example, the wireless air interface is an NR air interface. The wireless air interface can also be a wireless air interface based on a standard of next generation mobile communication network technology based on the 5G standard.

According to some embodiments, an end to end (E2E) link may also be established between the UEs 11, for example, a vehicle to vehicle (V2V) communication, a vehicle to infrastructure (V2I) communication, and a vehicle to pedestrian (V2P) communication in a vehicle to everything (V2X) communication.

According to some embodiments, the above wireless communication system may also include a network management device 13.

The access devices 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit, or a home subscriber server (HSS). The implementation form of the network management device 13 is not limited according the embodiments of the disclosure.

Figure 2:
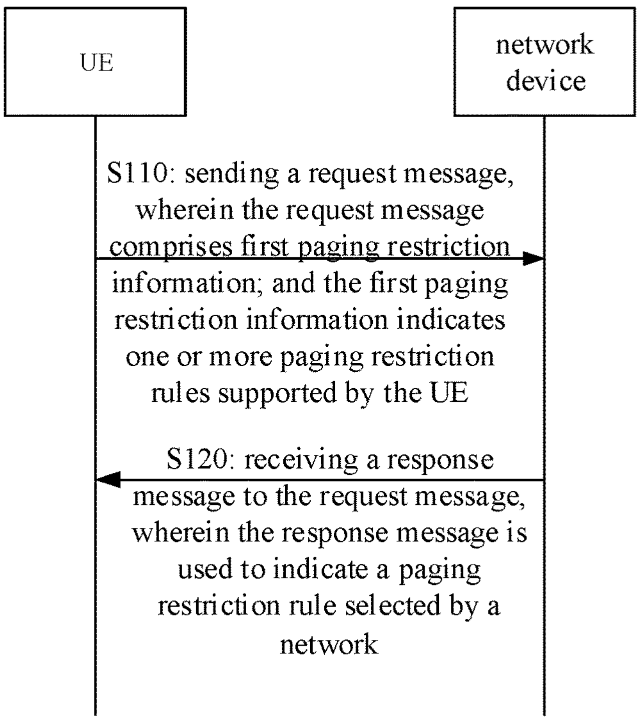
FIG. 2 is a schematic flowchart of a method for determining a paging restriction rule according to some embodiments.

As illustrated in FIG. 2, a method for determining a paging restriction rule is provided according to embodiments of the disclosure. The method is performed by a UE. The method includes the following.

S110, a request message is sent. The request message includes first paging restriction information. The first paging restriction information indicates one or more paging restriction rules supported by the UE.

S120, a response message to the request message is received. The response message is used to indicate a paging restriction rule selected by a network.

The UE may encompass various types, such as a mobile phone, a tablet computer, a wearable device, a smart home device, a smart office device, and/or a ground-walking robot, a low-altitude flying robot, and/or a smart vehicle-mounted device.

The UE may include a terminal including an SIM or a terminal including multiple SIMs.

The SIM may be a physical card, or an electronic SIM, namely an eSIM.

The type of the SIM is not limited herein. For example, according to the size of the SIM, the SIM may include a standard SIM, a Mini SIM, a Nano-SIM, or a cut-out standard SIM.

Sending the request message in S110 is sending the request message to the network device. For example, when it is involved that the core network pages an idle SIM, the network device may include a core network device. The core network device includes but is not limited to an access management function (AMF). For example, when it is involved that the access network (RAN) pages an RRC inactive SIM, the network device may include an access network device. The access network device includes but not limited to a base station.

The first paging restriction information indicates one of: an identification (ID) of the paging restriction rule(s) supported by the UE; or content of the paging restriction rule(s) supported by the UE.

Of course, the above is only an example of the first paging restriction information, and the specific implementation is not limited to this example herein.

The UE may report one or more paging restriction rules supported by itself. After receiving the one or more paging restriction rules reported by the UE, the network side may return the response message to the UE according to one or more paging restriction rules supported by the network side, so that the UE knows which paging restriction rule is used by the current network or whether the paging restriction rule reported by the UE is used by the current network, to restrict the paging message for paging the UE.

After receiving the response message, the UE may determine whether to monitor the paging message according to content of the response message.

The first paging restriction information may report one or more paging restriction rules supported or selected by the UE.

The response message may include feedback information, in which the feedback information indicates whether the network agrees or disagrees to accept the one or more paging restriction rules indicated by the first paging restriction information.

The feedback information may be an acknowledgment (ACK) or a negative acknowledgment (NACK) for the request message.

For example, the ACK may indicate that the network agrees to accept the paging restriction rule indicated by the first paging restriction information, that is, the network may use the paging restriction rule indicated by the first paging restriction information to restrict the paging message of the UE.

For another example, the NACK may indicate that the network does not agree to accept the paging restriction rule indicated by the first paging restriction information, that is, the network may not use the paging restriction rule indicated by the first paging restriction information to restrict the paging message of the UE.

For example, the first paging restriction information indicates a paging restriction rule selected or supported by the UE. If the response message carries an ACK, it means that the network supports and selects the paging restriction rule reported by the UE to restrict the paging message of the UE. At this time, after receiving the response message, the UE determines whether to monitor the paging message according to the paging restriction rule reported by itself. If it is determined not to monitor the paging message, the UE does not need to monitor the paging message on the paging occasion (PO) and if it is determined to monitor the paging message, the UE needs to monitor the paging message on the corresponding PO according to the paging configuration information.

For another example, the first paging restriction information indicates multiple paging restriction rules. The response message may include a bitmap, and the bitmap may include one or more bits in which at least one bit is used for carrying the ACK or NACK of the paging restriction rules indicated by the first paging restriction information, so that after receiving the response message, the UE may determine the paging restriction rule supported and selected by the network side by decoding the bitmap. If all the bits carried in the bitmap are the NACK, it means that the network side has not adopted any paging restriction rule reported by the UE, and at this time, the UE does not need to determine whether to monitor the paging message according to the paging restriction rule.

In conclusion, according to some embodiments of the disclosure, after the UE sends the first paging restriction information to the network side, the UE may receive the response message from the network side, so that it may determine according to the response message whether to monitor the paging message based on the paging restriction rule or determine which paging restriction rule is used to monitor the paging message.

According to some embodiments, the response message includes second paging restriction information, in which the second paging restriction information indicates the paging restriction rule supported by the network and selected from the one or more paging restriction rules indicated by the first paging restriction information.

Likewise, the second paging restriction information may include: an ID of the paging restriction rule supported or selected by the network side; content of the paging restriction rule supported or selected by the network side; or an indication bit of the paging restriction rule supported or selected by the network side.

In conclusion, the response message according to embodiments of the disclosure directly carries the second paging restriction information, so that when the UE receives the response message, the UE may determine according to the second paging restriction information the paging restriction supported and selected by the network side, so as to determine whether to monitor the paging message according to the paging restriction supported and selected by the network side.

According to some embodiments, the response message may further include time information. The time information indicates a time duration or duration information where the network side uses the paging restriction rule indicated by the second paging restriction information to restrict the paging message of the UE. In this way, when the time duration indicated by the time information ends, the adopted paging restriction rule may be re-negotiated between the UE and the network side.

Of course, according to other embodiments, the response message may not carry the duration information, and the effective duration of the paging restriction rule may be invalid after the corresponding SIM of the UE is switched to the RRC connected state.

Of course, the above is only an example, and the specific implementation is not limited thereto.

According to some embodiments, the paging restriction rule indicated by the first paging restriction information includes one of: a first paging restriction rule for indicating all paging messages are restricted; a second paging restriction rule for indicating all paging messages are restricted except a paging message triggered by a voice service; a third paging restriction rule for indicating all paging messages are restricted except a paging message triggered by a specific protocol data unit (PDU) session; or a fourth paging restriction rule for indicating all paging messages are restricted except a paging message triggered by a voice service and a specific PDU session.

The first paging restriction rule is for restricting the paging message. If the UE supports the first paging restriction rule, and the network side also supports and selects the first paging restriction rule, the UE receives the response message for indicating the first paging restriction rule and the UE does not monitor the paging message after entering the RRC idle state or the RRC inactive state.

The paging message delivered by the network side may include a paging messages triggered by a system update; or a paging message triggered by a service. The paging message triggered by the service, for example, is that a peer UE calls the UE or there are service data to be sent to the UE.

The voice service includes but is not limited to an internet protocol multimedia subsystem (IMS) voice service. The specific PDU session includes but is not limited to a PDU session corresponding to an ultra-reliable low-latency communication (URLLC) service. Of course, this is only an example, and the specific implementation is not limited thereto.

According to some embodiments, the fourth paging restriction rule is also introduced, and this paging restriction rule may restrict all paging messages except the paging message trigger by the voice service and the specific PDU session.

According to some embodiments, the second paging restriction information includes an identifier of the paging restriction rule supported by the network and selected from the one or more paging restriction rules indicated by the first paging restriction information.

Figure 3A:
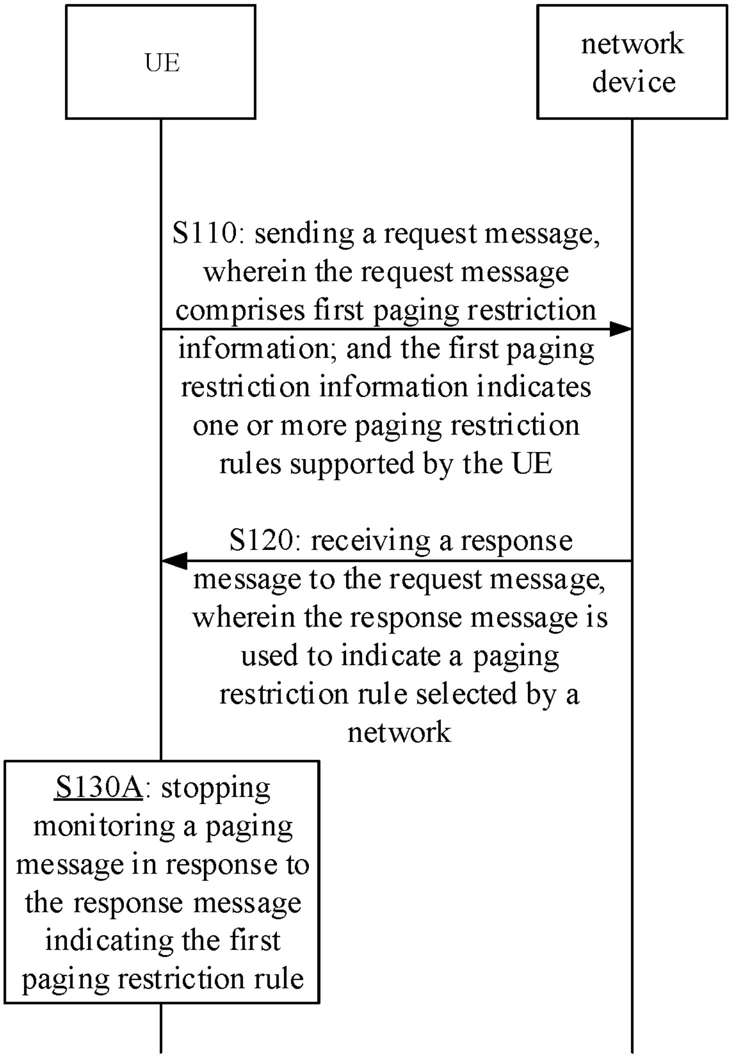
FIG. 3A is a schematic flowchart of a method for determining a restriction rule according to some embodiments.

According to some embodiments, as illustrated in FIG. 3A, the method further includes the following.

S130A, it stops monitoring a paging message in response to the response message indicating the first paging restriction rule.

Figure 3B:
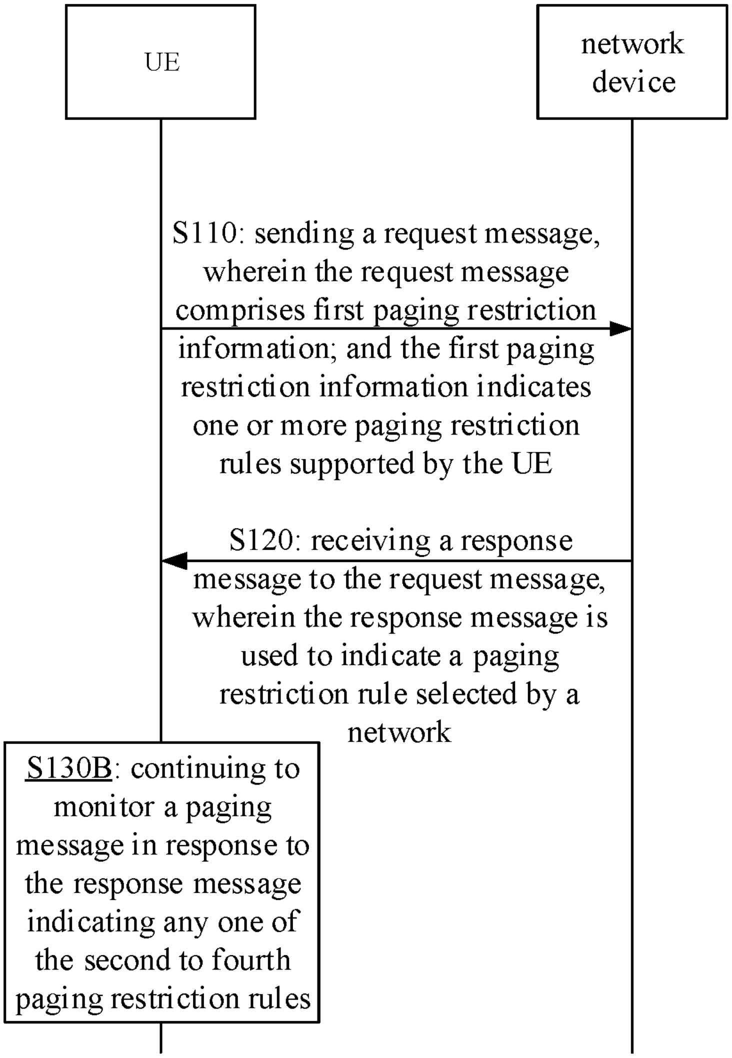
FIG. 3B is a schematic flowchart of a method for determining a restriction rule according to some embodiments.

According to other embodiments, as illustrated in FIG. 3B, the method further includes the following.

S130B, it continues to monitor a paging message in response to the response message indicating any one of the second to fourth paging restriction rules.

If the response message carries the ACK or the NACK, etc., the paging restriction rule supported or selected by the network side may be determined according to the correspondence between the response message and the paging restriction rule.

If the response message includes the second paging restriction information, the paging restriction rule supported or selected by the network side may be determined according to the paging restriction rule indicated by the second paging restriction information.

According to some embodiments, the request message further includes connection release information for indicating that an SIM of the UE is to release a connection.

The connection release information indicates that the SIM of the UE needs to switch from the RRC connected state to the RRC idle state or the RRC inactive state.

The request message carries the connection release information, and may also carry the first paging restriction information, so that when an SIM of the UE is off the network, the paging restriction rule may be negotiated with the network side. Therefore, the negotiation of the paging restriction rule between the UE and the network side may be completed without introducing an additional new signaling.

According to some embodiments, the request message includes a service request message carrying the connection release information; or a registration request message carrying the connection release information.

The above is an example of the request message carrying the connection release information and the first paging restriction information, and the specific implementation is not limited to this example herein.

According to some embodiments, the UE includes a UE including multiple SIMs, and sending the request message includes: sending the request message in response to an SIM of the UE switches from an RRC connected state to a non-connected state; in which the non-connected state includes an idle state or an inactive state.

The connected state may include: a connection management (CM) connected state on the core network (CN) side, a CM connected state and an RRC connected state on the UE and RAN sides.

The idle state may include: an CM idle state of the CN, an CM idle state and an RRC idle state of UE and RAN side.

The non-connected state may also include: an RRC inactive state (abbreviated as the inactive state) of the UE and the RAN.

If the UE is a terminal with multiple SIMs and when an SIM of the UE is off the network, it may send the request message to the network side in which the request message may carry the first paging restriction information, and receive the response message to the request message, so as to realize the negotiation of the paging restriction rule with the network side.

Figure 4:
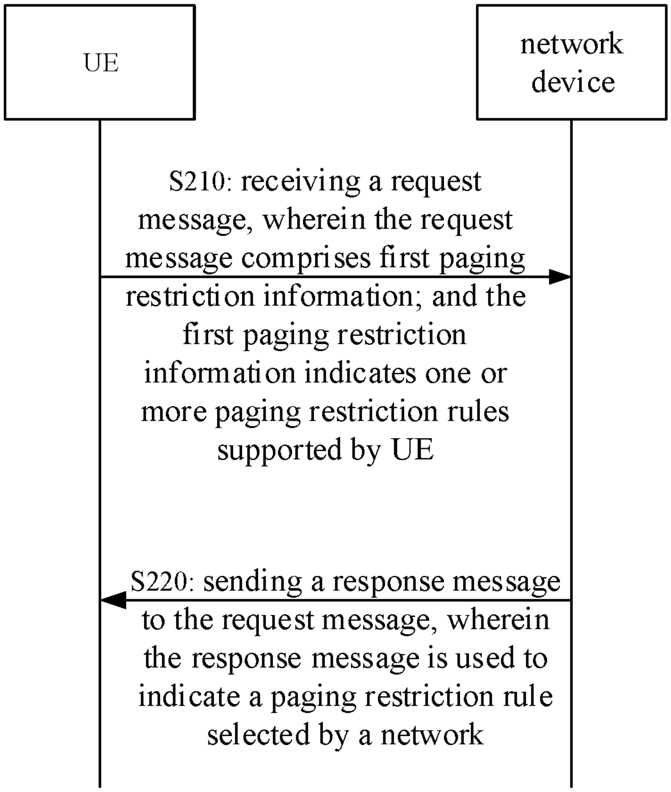
FIG. 4 is a schematic flowchart of a method for determining a restriction rule according to some embodiments.

As illustrated in FIG. 4, a method for determining a paging restriction rule is provided according to embodiments of the disclosure. The method is performed by a network device. The method includes the following.

S210, a request message is received. The request message includes first paging restriction information. The first paging restriction information indicates one or more paging restriction rules supported by the UE.

S220, a response message to the request message is sent. The response message is used to indicate a paging restriction rule selected by a network.

The network device may be a core network device or an access network device. The core network device may include: AMF, MME, or the like. The access network device may include a base station or the like.

After receiving the request message carrying the first paging restriction information, the network device may send the response message to the UE, so that the UE knows the paging restriction rule supported or selected by the network side.

According to some embodiments, the response message includes: feedback information for indicating whether the network agrees or disagrees to accept the one or more paging restriction rules indicated by the first paging restriction information; or second paging restriction information for indicating the paging restriction rule supported by the network and selected from the one or more paging restriction rules indicated by the first paging restriction information.

According to some embodiments, the relevant descriptions of the first paging restriction information and the second paging restriction information may refer to the foregoing embodiments, and may not be repeated herein.

For example, the response message may carry the second paging restriction information or may not carry the paging restriction information. If the response message carries the second paging restriction information, the second paging restriction information includes an identifier of the paging restriction rule supported by the network and selected from the one or more paging restriction rules indicated by the first paging restriction information. Of course, this is only an example, and the specific implementation is not limited to this example.

Figure 5:
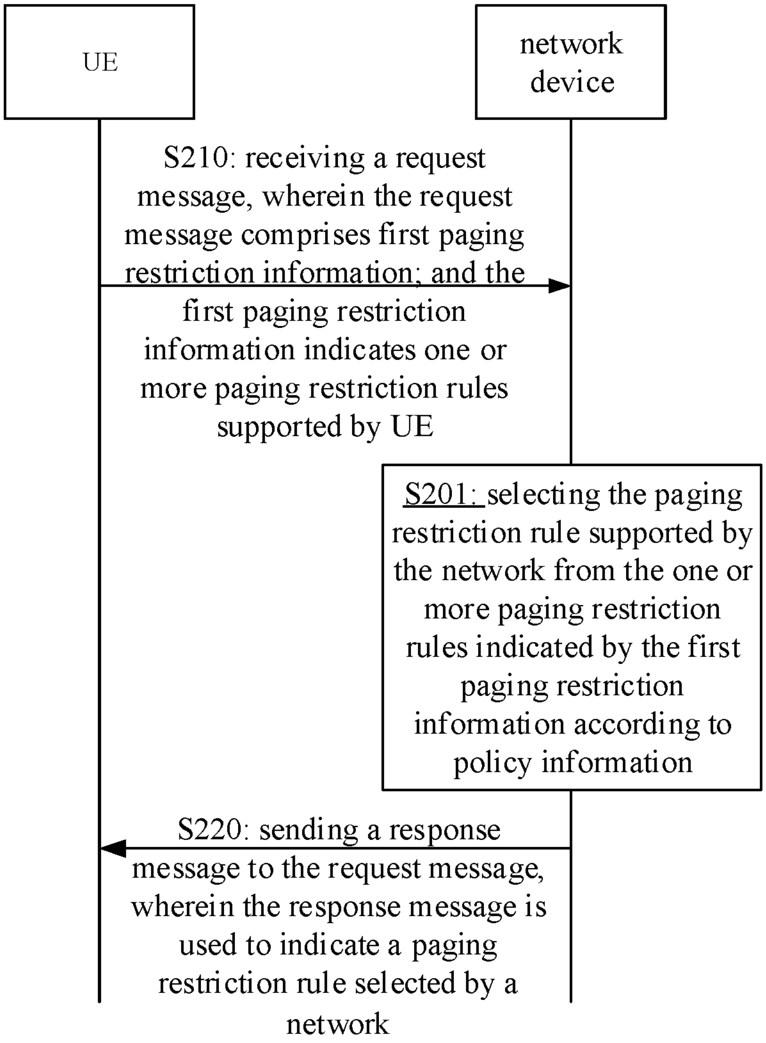
FIG. 5 is a schematic flowchart of a method for determining a restriction rule according to some embodiments.

According to some embodiments, as illustrated in FIG. 5, the method also includes the following.

S201, the paging restriction rule supported by the network is selected from the one or more paging restriction rules indicated by the first paging restriction information according to policy information.

For example, when there are multiple paging restriction rules indicated by the first paging restriction information and there are multiple paging restriction rules supported by the network side, the network device may select the paging restriction rule from the multiple paging restriction rules indicated by the first paging restriction information according to the policy information.

When selecting the paging restriction rule according to the policy information, the selected paging restriction rule may be comprehensively determined with reference to factors such as network conditions and/or UE types.

According to some embodiments, the policy information includes: policy information locally stored on the network device; or policy information queried from a policy control function (PCF).

For example, if the network device is an AMF, the policy information locally stored may be policy information locally stored by the AMF. If the network device is a base station, the policy information locally stored may be policy information locally stored by the base station.

According to some embodiments, the network device may also request the policy information from the PCF.

The policy information may be for a single UE, for a UE group, or for a certain type of UEs.

According to some embodiments, the paging restriction rule supported by the network is selected from the paging restriction rule(s) indicated by the first paging restriction information.

According to some embodiments, the request message further includes: connection release information for indicating that an SIM of the UE is to release a connection.

If the SIM of the UE enters an idle state, the request message may be a non-access stratum (NAS) message.

If the SIM of the UE enters an inactive state, the request message may be an RRC message.

If the request message is the NAS message, the request message includes: a service request message carrying the connection release information; or a registration request message carrying the connection release information.

According to embodiments of the disclosure, the UE sends the information on the paging restriction rule(s) to the network, and the network feeds back the received paging restriction rule(s) to realize the more specific negotiation of the restriction rule, especially when the network only supports part of the restriction rule(s).

The UE initiates a request message such as a Service Request or a Registration Request, where the request message carries paging restriction information. The paging restriction information indicates one or more of the following paging restriction rules:

a) a paging restriction rule that all paging is restricted
b) a paging restriction rule that all paging is restricted, except paging for voice service (IMS voice);
c) a paging restriction rule that all paging is restricted, except paging for certain PDU Session(s); or,
d) a paging restriction rule that all paging is restricted, except paging for voice service (IMS voice) and certain PDU session(s).

The AMF receives the paging restriction information, and determines whether the network supports the paging restriction rule(s) supported or selected by the UE according to the local policy and the like.

The AMF sends a response message to the UE, including an identifier of a paging restriction (PR) rule accepted by the network. The identifier of the PR rule accepted by the network is the paging restriction rule supported by the base station and selected by the network side from the supported paging restriction rule(s) reported by the UE.

The UE makes a corresponding adjustment according to the identifier of the received PR, such as not monitoring the PO, that is, not monitoring the paging message, thereby reducing the power consumption of the UE for monitoring the paging message.

Figure 6:
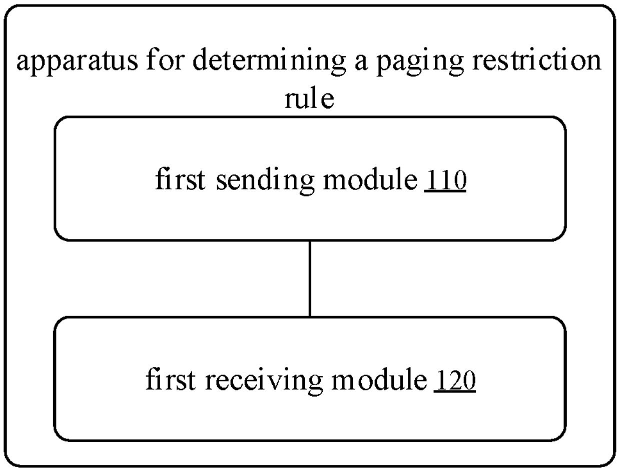
FIG. 6 is a schematic block diagram of an apparatus for determining a paging restriction rule according to some embodiments.

As illustrated in FIG. 6, an apparatus for determining a paging restriction rule is provided according to embodiments of the disclosure. The apparatus includes a first sending module 110 and a first receiving module 120.

The first sending module 110 is configured to send a request message. The request message includes first paging restriction information. The first paging restriction information includes one or more paging restriction rules supported by the UE.

The first receiving module 120 is configured to receive a response message to the request message. The response message is used to indicate a paging restriction rule selected by a network.

The apparatus for determining a paging restriction rule may be included in the UE.

According to embodiments, the first sending module 110 and the first receiving module 120 may be program modules; and when the program modules are executed by a processor, functions of the above modules may be realized.

According to embodiments, the first sending module 110 and the first receiving module 120 may be soft and hard combination modules; the soft and hard combination modules include but are not limited to a programmable array; and the programmable array includes but is not limited to a field programmable array and/or a complex programmable array.

According to embodiments, the first sending module 110 and the first receiving module 120 may be pure hardware modules; and the pure hardware module includes but is not limited to an application specific integrated circuit.

According to embodiments, the response message includes: feedback information for indicating whether the network agrees or disagrees to accept the one or more paging restriction rules indicated by the first paging restriction information; or second paging restriction information for indicating the paging restriction rule supported by the network and selected from the one or more paging restriction rules indicated by the first paging restriction information.

According to embodiments, the paging restriction rule indicated by the first paging restriction information includes one of: a first paging restriction rule for indicating all paging messages are restricted; a second paging restriction rule for indicating all paging messages are restricted except a paging message triggered by a voice service; a third paging restriction rule for indicating all paging messages are restricted except a paging message triggered by a specific PDU session; or a fourth paging restriction rule for indicating all paging messages are restricted except a paging message triggered by a voice service and a specific PDU session.

According to embodiments, the second paging restriction information includes an identifier of the paging restriction rule supported by the network and selected from the one or more paging restriction rules indicated by the first paging restriction information.

According to embodiments, the apparatus also includes: a paging module configured to stop monitoring a paging message in response to the response message indicating the first paging restriction rule; or continue to monitor a paging message in response to the response message indicating any one of the second to fourth paging restriction rules.

According to embodiments, the second paging restriction information includes an identifier of the paging restriction rule supported by the network and selected from the one or more paging restriction rules indicated by the first paging restriction information.

According to embodiments, the request message further includes: connection release information for indicating that an SIM of the UE is to release a connection.

According to embodiments, the request message includes: a service request message carrying the connection release information; or a registration request message carrying the connection release information.

According to embodiments, the UE is a UE including multiple SIMs and the first sending module 110 is configured to send the request message in response to an SIM of the UE switches from an RRC connected state to a non-connected state; in which the non-connected state includes an idle state or an inactive state.

Figure 7:
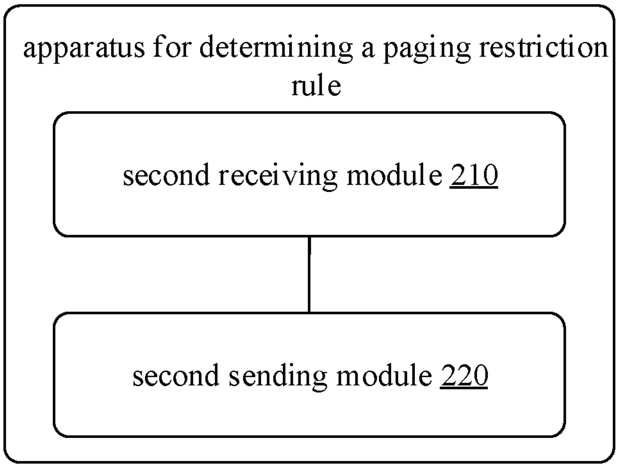
FIG. 7 is a schematic block diagram of an apparatus for determining a paging restriction rule according to some embodiments.

As illustrated in FIG. 7, an apparatus for determining a paging restriction rule is provided according to embodiments of the disclosure. The apparatus is executed by a network device. The apparatus includes a second receiving module 210 and a second sending module 220.

The second receiving module 210 is configured to receive a request message. The request message includes first paging restriction information. The first paging restriction information includes one or more paging restriction rules supported by the UE.

The second sending module 220 is configured to send a response message to the request message. The response message is used to indicate a paging restriction rule selected by a network.

The apparatus for determining a paging restriction rule may be included in the network device, and the network device includes but is not limited to: a core network device and/or an access network device.

According to embodiments, the second sending module 220 and the second receiving module 210 may be program modules; and when the program modules are executed by a processor, functions of the above modules may be realized.

According to embodiments, the second sending module 220 and the second receiving module 210 may be soft and hard combination modules; the soft and hard combination modules include but are not limited to a programmable array; and the programmable array includes but is not limited to a field programmable array and/or a complex programmable array.

According to embodiments, the second sending module 220 and the second receiving module 210 may be pure hardware modules; and the pure hardware module includes but is not limited to an application specific integrated circuit.

According to embodiments, the response message includes: feedback information for indicating whether the network agrees or disagrees to accept the one or more paging restriction rules indicated by the first paging restriction information; or second paging restriction information for indicating the paging restriction rule supported by the network and selected from the one or more paging restriction rules indicated by the first paging restriction information.

According to embodiments, the second paging restriction information includes an identifier of the paging restriction rule supported by the network and selected from the one or more paging restriction rules indicated by the first paging restriction information.

According to embodiments, the apparatus also includes a selecting module configured to select the paging restriction rule supported by the network from the one or more paging restriction rules indicated by the first paging restriction information according to policy information.

According to embodiments, the policy information includes: policy information locally stored on the network device; or policy information queried from a PCF.

According to embodiments, the request message further includes: connection release information for indicating that an SIM of the UE is to release a connection.

According to embodiments, the request message includes: a service request message carrying the connection release information; or a registration request message carrying the connection release information.

A communication device is provided according to embodiments of the disclosure and includes a memory for storing processor-executable instructions; and a processor, connected to the memory.

The processor is configured to execute the method for determining a paging restriction rule provided by the UE and/or the network device according to any of the foregoing technical solutions.

The processor may include various types of storage media, which are non-transitory computer storage media, and may continue to memorize and store information thereon after the communication device is powered off.

The communication device includes: an access network device or a UE or a core network device. If the communication device is an access network device, the access network device may be a base station. If the communication device is a core network device, the core network device may be an AMF or an MME.

The processor may be connected to the memory through a bus, etc., for reading the executable program stored on the memory, for example, at least one of the methods illustrated in FIG. 2, FIG. 3A, FIG. 3B, FIG. 4 to FIG. 5.

Figure 8:
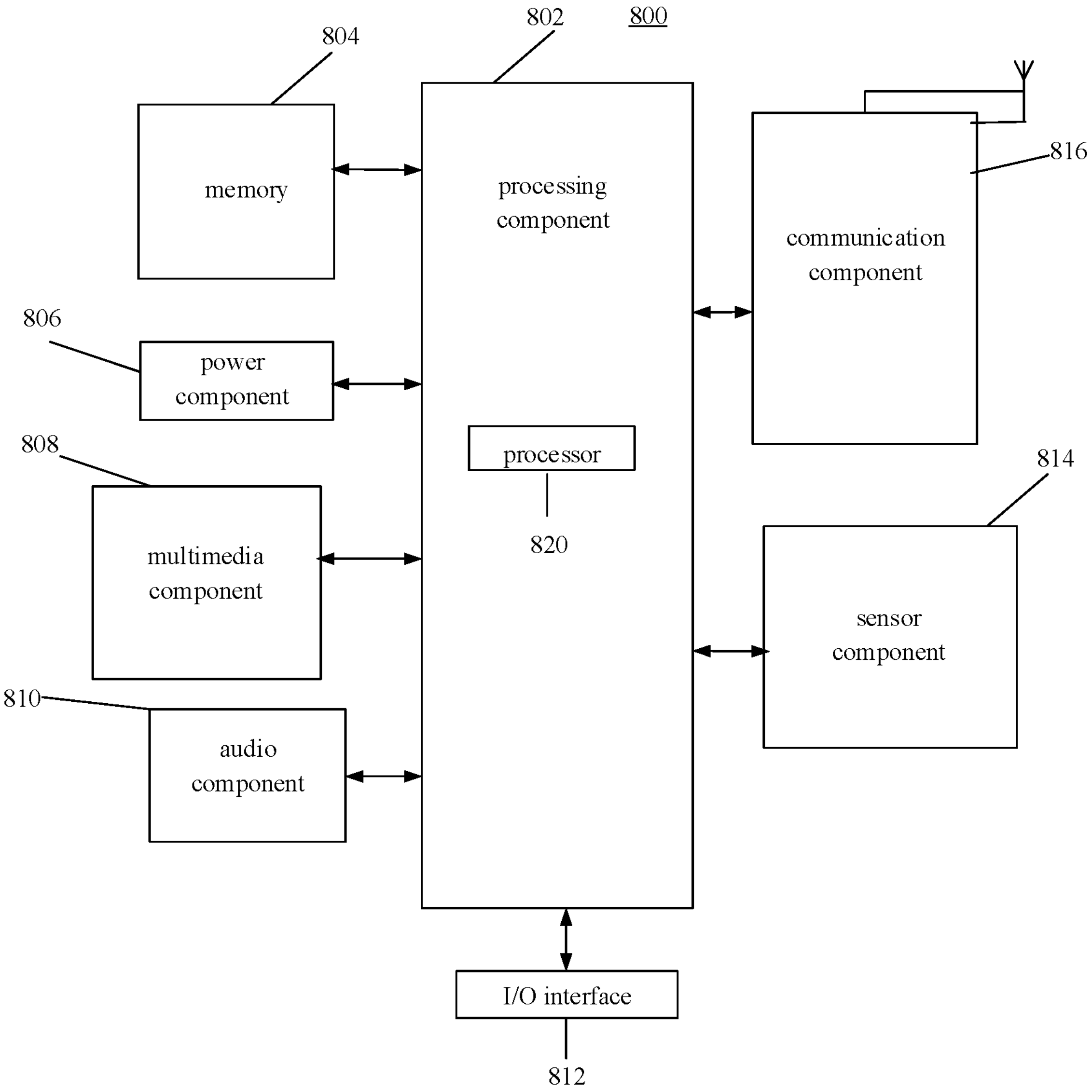
FIG. 8 is a schematic block diagram of a UE according to some embodiments.

FIG. 8 is a block diagram of a UE 800 according to some embodiments. For example, the UE 800 may be a mobile phone, a computer, a digital broadcast terminal, a messaging device, a gaming console, a tablet, a medical device, exercise equipment, a personal digital assistant, and the like.

Referring to FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. According to some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. According to some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the UE 800 is in an operation mode, such as a call mode, a recording mode, and a voice recognition mode. The received audio signal may be further stored in the memory 804 or transmitted via the communication component 816. According to some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. According to some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi™, 2G, or 3G, or a combination thereof. According to some embodiments, the communication component 816 receives a broadcast signal or broadcast associated information from an external broadcast management system via a broadcast channel. According to some embodiments, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

According to some embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

According to some embodiments, there is also provided a non-transitory computer-readable storage medium including instructions, such as included in the memory 804, executable by the processor 820 in the UE 800, for performing the above-described methods. For example, the non-transitory computer-readable storage medium may be a ROM, a RAM, a CD-ROM, a magnetic tape, a floppy disc, an optical data storage device, and the like.

Figure 9:
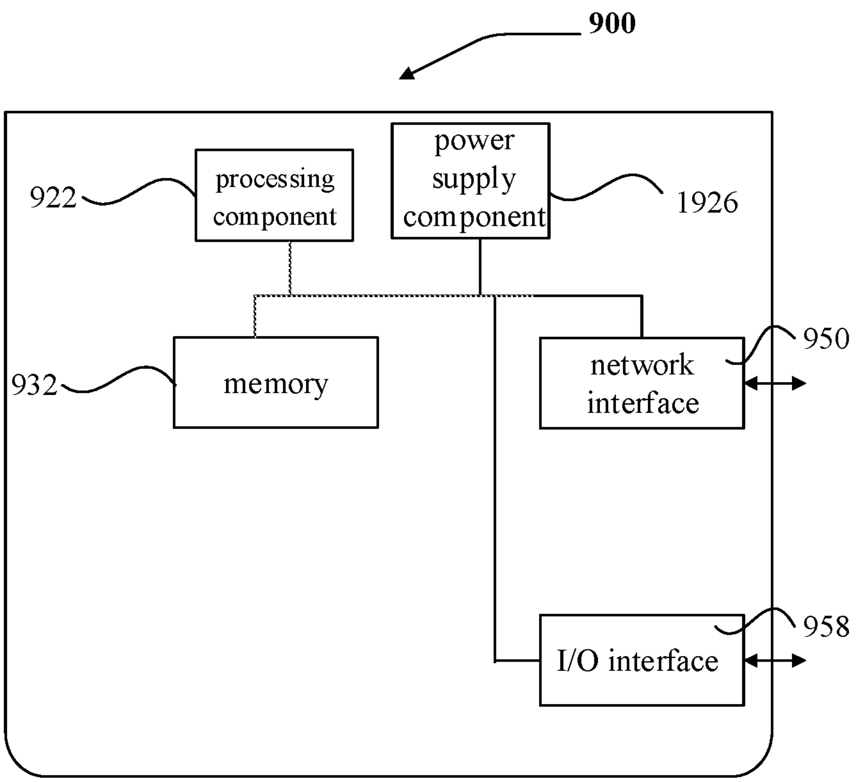
FIG. 9 is a schematic block diagram of a communication device according to some embodiments.

As illustrated in FIG. 9, it illustrates a structure of an access device according to some embodiment. For example, the communication device 900 may be provided as a network side device. The communication device may be the aforementioned access device and/or core network device.

Referring to FIG. 9, the communication device 900 includes a processing component 922 (e.g. one or more processors), and a memory resource represented by a memory 932 for storing instructions executable by the processing component 922, such as application programs. The application program stored in the memory 932 may include one or more modules each corresponding to a set of instructions. In addition, the processing component 922 is configured to execute instructions to perform any of the aforementioned methods applied to the access device, for example, the methods illustrated in FIG. 2, FIG. 3A, FIG. 3B, and FIG. 4 to FIG. 5.

The communication device 900 may also include a power supply component 926 configured to perform power management of the communication device 900, a wired or wireless network interface 950 configured to connect the communication device 900 to a network, and an I/O interface 958. The communication device 900 may operate based on an operating system stored in the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed herein. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a paging restriction rule, performed by a user equipment (UE), the method comprising:

sending a request message, wherein the request message comprises first paging restriction information; and the first paging restriction information indicates paging restriction rules supported by the UE; and the paging restriction rules comprise: a first paging restriction rule for indicating all paging messages are restricted; a second paging restriction rule for indicating all paging messages are restricted except a paging message triggered by a voice service; a third paging restriction rule for indicating all paging messages are restricted except a paging message triggered by a specific protocol data unit (PDU) session; and a fourth paging restriction rule for indicating all paging messages are restricted except a paging message triggered by a voice service and a specific PDU session; and receiving a response message to the request message, wherein the response message indicates whether the first paging restriction information is accepted or not by a network device, the response message comprising second paging restriction information for indicating one or more paging restriction rules determined by the network device according to capability of the network device, wherein the network device supports fewer paging restriction rules than the UE, and the one or more paging restriction rules are selected by the network device from the paging restriction rules indicated by the first paging restriction information.

2. The method according to claim 1, wherein the response message indicating whether the first paging restriction information is accepted or not by the network device, further comprises:

feedback information for indicating whether the network device accepts or not the paging restriction rules indicated by the first paging restriction information.

3. The method according to claim 1, wherein the second paging restriction information comprises an identifier of each of the one or more paging restriction rules supported by the network device and selected from the paging restriction rules indicated by the first paging restriction information.

4. The method according to claim 1, further comprising:

stopping monitoring a paging message when the response message indicating the first paging restriction rule; or continuing to monitor a paging message when the response message indicating any one of the second to fourth paging restriction rules.

5. The method according to claim 1, wherein the request message further comprises: connection release information for indicating that a subscriber identity module (SIM) of the UE is to release a connection.

6. The method according to claim 5, wherein the request message comprises:

a service request message carrying the connection release information;

or, a registration request message carrying the connection release information.

7. The method according to claim 1, wherein the UE comprises multiple SIMs and sending the request message comprises:

sending the request message in response to a SIM of the UE switches from a radio resource control (RRC) connected state to a RRC non-connected state; wherein the RRC non-connected state comprises an idle state or an inactive state.

8. A non-transitory computer-readable storage medium having stored therein instructions that, when executed by a processor of a user equipment (UE), causes the UE to perform the method according to claim 1.

9. The method according to claim 1, wherein the second paging restriction information comprises a bitmap, and the bitmap comprises at least one bit used for carrying an acknowledgment (ACK) or a negative acknowledgment (NACK) of the paging restriction rules indicated by the first paging restriction information; wherein for a paging restriction rule among the paging restriction rules, ACK indicates that the paging restriction rule is supported and selected by the network device, and NACK indicates that the paging restriction rule is not supported or selected by the network device.

10. A method for determining a paging restriction rule, performed by a network device, the method comprising:

receiving a request message, wherein the request message comprises first paging restriction information; and the first paging restriction information indicates paging restriction rules supported by a user equipment (UE); and the paging restriction rules comprise: a first paging restriction rule for indicating all paging messages are restricted; a second paging restriction rule for indicating all paging messages are restricted except a paging message triggered by a voice service; a third paging restriction rule for indicating all paging messages are restricted except a paging message triggered by a specific protocol data unit (PDU) session; and a fourth paging restriction rule for indicating all paging messages are restricted except a paging message triggered by a voice service and a specific PDU session; and sending a response message to the request message, wherein the response message indicates whether the first paging restriction information is accepted or not by the network device, the response message comprising second paging restriction information for indicating one or more paging restriction rules determined by the network device according to capability of the network device, wherein the network device supports fewer paging restriction rules than the UE, and the one or more paging restriction rules are selected by the network device from the paging restriction rules indicated by the first paging restriction information.

11. The method according to claim 10, wherein the response message indicating whether the first paging restriction information is accepted or not by the network device, further comprises:

feedback information for indicating whether the network device accepts or not the paging restriction rules indicated by the first paging restriction information.

12. The method according to claim 10, wherein the second paging restriction information comprises an identifier of each of the one or more paging restriction rules supported by the network device and selected from the paging restriction rules indicated by the first paging restriction information.

13. The method according to claim 10, further comprising:

selecting the one or more paging restriction rules supported by the network device from the paging restriction rules indicated by the first paging restriction information according to policy information.

14. The method according to claim 13, wherein the policy information comprises:

policy information locally stored on the network device; or, policy information queried from a policy control function (PCF).

15. The method according to claim 10, wherein the request message further comprises: connection release information for indicating that a subscriber identity module (SIM) of the UE is to release a connection.

16. The method according to claim 15, wherein the request message comprises:

a service request message carrying the connection release information;

or, a registration request message carrying the connection release information.

17. A communication device, comprising:

a processor;

a transceiver; and a memory for storing executable programs, wherein the processor is configured to perform the executable programs to carry out the method according to claim 10.

18. A non-transitory computer-readable storage medium having stored therein instructions that, when executed by a processor of a network device, causes the network device to perform the method according to claim 10.

19. A communication device, comprising:

a processor;

a transceiver; and a memory for storing executable programs, wherein the processor is configured to perform the executable programs to carry out:

sending a request message, wherein the request message comprises first paging restriction information; and the first paging restriction information indicates paging restriction rules supported by the communication device; and the paging restriction rules comprise: a first paging restriction rule for indicating all paging messages are restricted; a second paging restriction rule for indicating all paging messages are restricted except a paging message triggered by a voice service; a third paging restriction rule for indicating all paging messages are restricted except a paging message triggered by a specific protocol data unit (PDU) session; and a fourth paging restriction rule for indicating all paging messages are restricted except a paging message triggered by a voice service and a specific PDU session; and receiving a response message to the request message, wherein the response message indicates whether the first paging restriction information is accepted or not by a network device, the response message comprising second paging restriction information for indicating one or more paging restriction rules determined by the network device according to capability of the network device, wherein the network device supports fewer paging restriction rules than the communication device, and the one or more paging restriction rules are selected by the network device from the paging restriction rules indicated by the first paging restriction information.

20. The communication device according to claim 19, wherein the response message further comprises:

feedback information for indicating whether the network device accepts or not the paging restriction rules indicated by the first paging restriction information.

* * * * *